United States Patent
Winter et al.

(10) Patent No.: US 6,476,760 B1
(45) Date of Patent: Nov. 5, 2002

(54) DEVICE FOR DETECTING ANGLE OF ELEVATION ERROR IN A MULTIPLE BEAM RADAR SENSOR

(75) Inventors: Klaus Winter, Schwieberdingen; Klaus-Peter Wagner, Stuttgart; Sonja Eder, Koengen; Herbert Olbrich, Rutesheim; Jörg Schneemann, Weissach, all of (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/807,196
(22) PCT Filed: Jul. 21, 2000
(86) PCT No.: PCT/DE00/02371
§ 371 (c)(1), (2), (4) Date: Oct. 11, 2001
(87) PCT Pub. No.: WO01/11385
PCT Pub. Date: Feb. 15, 2001

(30) Foreign Application Priority Data

Aug. 10, 1999 (DE) .......................................... 199 37 723

(51) Int. Cl.$^7$ ............................... G01S 7/40; G01S 13/44
(52) U.S. Cl. ........................... 342/173; 342/59; 342/70; 342/73; 342/74; 342/75; 342/80; 342/104; 342/117; 342/149; 342/175; 342/195
(58) Field of Search ............................ 342/59, 73–81, 342/104, 117, 149–158, 165–175, 195, 378–384, 70, 71, 72, 27, 28, 368–377; 370/339

(56) References Cited

U.S. PATENT DOCUMENTS 4,564,935 A * 1/1986 Kaplan ....................... 342/373
5,049,888 A * 9/1991 Prenat ........................ 342/149
5,371,506 A * 12/1994 Yu et al. ..................... 342/149
6,337,656 B1 * 1/2002 Natsume et al. ............ 342/149

FOREIGN PATENT DOCUMENTS

| DE | 196 50 863 C1 | 4/1998 |
| DE | 197 48 604 A1 | 5/1999 |
| EP | 0 809 118 A1 | 11/1997 |
| WO | WO 97 20 229 A1 | 6/1997 |
| WO | WO 97 40 400 A1 | 10/1997 |

* cited by examiner

Primary Examiner—Bernarr E. Gregory
(74) Attorney, Agent, or Firm—Kenyon & Kenyon

(57) ABSTRACT

A method and a radar sensor for determining an elevation angle error of a multibeam radar sensor are described. In order to detect an elevation angle of the multibeam radar system with respect to a predefined target, a plurality of laterally arranged cutting planes at a predefined distance are formed. The values of the corresponding antenna diagrams in each plane are stored in a suitable form, for example, normalized and in a parametric form taking into account the elevation angle α. In order to reduce the size of the memory, it is sufficient to store one symmetry half for reasons of symmetry if additional information, for example, road clutter values are added, so that the upward or downward direction of the angle can be recognized. By comparing the measured echo values obtained by normalization and application of a quality factor, a corresponding elevation angle α is obtained for each cutting plane. Using an appropriate histogram, an angle for the maladjustment of radar sensor can be determined from the measured values stored over a longer period of time.

14 Claims, 3 Drawing Sheets

US 6,476,760 B1

DEVICE FOR DETECTING ANGLE OF ELEVATION ERROR IN A MULTIPLE BEAM RADAR SENSOR

FIELD Of THE INVENTION

The present invention relates to a method for determining an elevation angle error in a multibeam radar sensor and on a radar sensor.

BACKGROUND INFORMATION

Multibeam radar systems and sensors for determining an azimuth angle or an elevation angle with respect to a detected target are known. For example, German Published Patent Application No. 197 48 604 describes a method for determining an azimuth angle and/or an elevation angle in which at least two echo signals of the radar target are recorded. The amplitude of each echo, i.e., received beam is normalized and compared to normalized values of an antenna diagram which are determined in advance for the horizontal basic plane formed by the radar system and stored. The results of the comparison from at least two received beams are linked to form an angle-dependent analysis quantity and the angle for which a minimum or maximum criterion is met is determined. In order to determine the angle, the phase angle of at least two recorded echo signals in addition to the amplitude are analyzed.

This method works satisfactorily as long as the target, which is assumed to be punctiform in the ideal case, is located in the zero degree plane of the basic plane swept by the radar sensor. In the case of elevation angles between the plane of the radar sensor and the target, an error occurs in analyzing the amplitude relationships between the transmitted and echo signals, which becomes greater as the elevation angle increases.

SUMMARY OF THE INVENTION

The method and device according to the present invention have the advantage over the related art that one or more lateral cutting planes are formed parallel to the zero degree plane and the respective values of the antenna diagram are determined for these lateral cutting planes and stored with reference to the respective elevation angle. Thus additional diagram values are advantageously obtained, which allows the elevation angle and thus also an error angle to be reliably determined, for example, in order to adjust the elevation of the radar sensor.

Since the reference antenna diagrams are symmetric with respect to their vertical axes, memory space can be advantageously saved if only the values for one symmetry half of a cutting plane are stored. For example, it is sufficient to store only the values having a positive angle of a cutting plane together with their direction, since the values for negative angles are identical except for their direction.

It is furthermore advantageous that the values for the antenna diagrams are normalized and thus dependent on the absolute signal amplitude. The received signal amplitudes of the radar beams are also normalized. Normalized amplitude values and normalized antenna diagram values are compared for each reference diagram and a quality value is applied. The value with the highest probability can be determined from the plurality of determined elevation angle values. The optimum azimuth angle determined for this purpose can then be output as a result.

In order to recognize and eliminate erroneous measurements, it is of advantage to output the elevation angles that have been determined in a diagram, for example, in the form of an angle distribution. The elevation angles assigned to the individual cutting planes can thus be more easily analyzed.

In long-term measurements, it can be determined, by comparing the mean values of the individual diagrams (histograms), whether there is maladjustment of the radar sensor and whether readjustment may be required.

It is considered particularly advantageous that, in using the radar sensor in a motor vehicle, the movements of the vehicle during travel can be recognized in a simple manner and, for example, distance measurements to a vehicle traveling ahead can be performed with greater accuracy and reliability.

DETAILED DESCRIPTION

Figure 1:
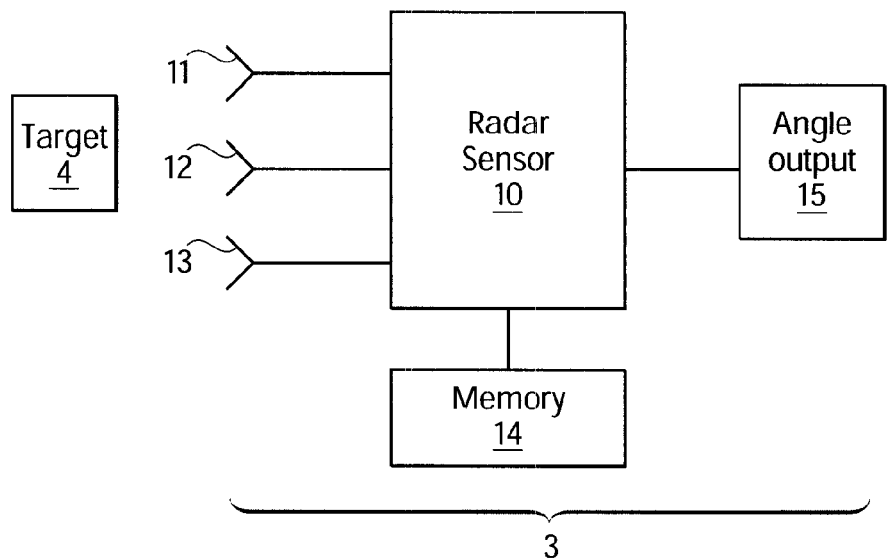
FIG. 1 shows a block diagram of a radar sensor.

FIG. 1 schematically shows a block diagram of a radar sensor having a controller 10, through which radar beams are transmitted using transmitting/receiving antennas 11, 12, 13, the radar beams being reflected from a target 4. The reflected echo signals are recaptured by transmitting/receiving antennas 11, 12, 13 and analyzed in controller 10. Controller 10 is connected to a memory 14, in which appropriate values (e.g., normalized amplitude and phase values, etc.) of antenna diagrams are stored for a plurality of laterally arranged cutting places 1. The stored values are used as reference values for the echo signals received by antennas 11, 12, 13. Furthermore, the controller is connected to an angle output 15, in which an elevation angle is output, for example, in the form of an optical display or an electric signal. In comparing with the basic plane, the elevation angle can be output as a maladjustment, i.e., error angle.

The radar sensor with its individual components is known per se, for example, from German Published Patent Application No. 197 48 604 and therefore does not need to be described in more detail. The operation of the arrangement according to the present invention will be explained in more detail below.

Figure 2:
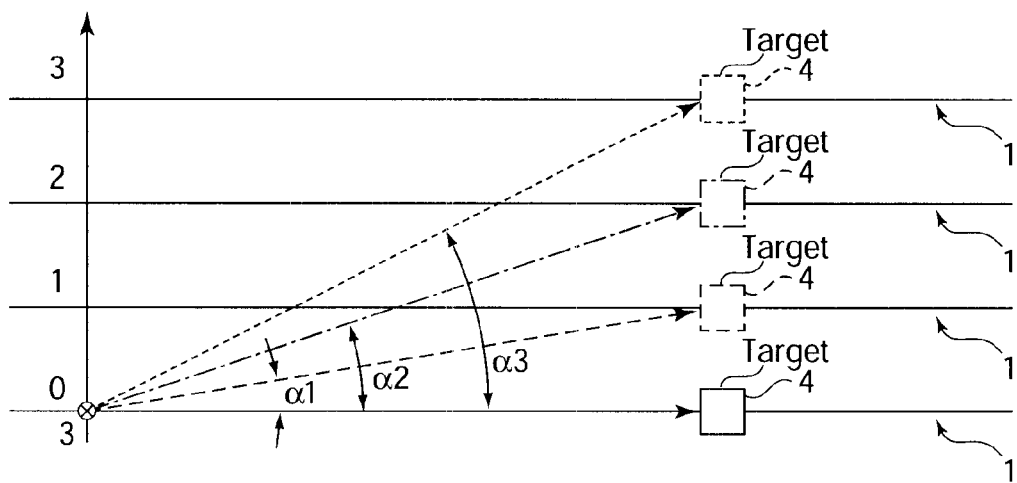
FIG. 2 shows a detected target with the respective elevation angle.

FIG. 2 shows, for better understanding, a diagram of the formation of elevation angle α formed between radar sensor 3 and a (preferably punctiform) target 4 assumed to be located in a plurality of cutting planes 0, 1, 2, 3 with respect to basic plane 0. If target 4 is located in cutting plane 0, the elevation angle α0=0. In contrast, an elevation angle α1 is formed with respect to target 4 in the first cutting plane. The assumed target 4 in the second cutting plane forms elevation angle α2, while target 4 in the third cutting plane forms elevation angle α3, etc. Negative angles are formed in an analogous manner; they are not illustrated for the sake of clarity.

Figure 3:
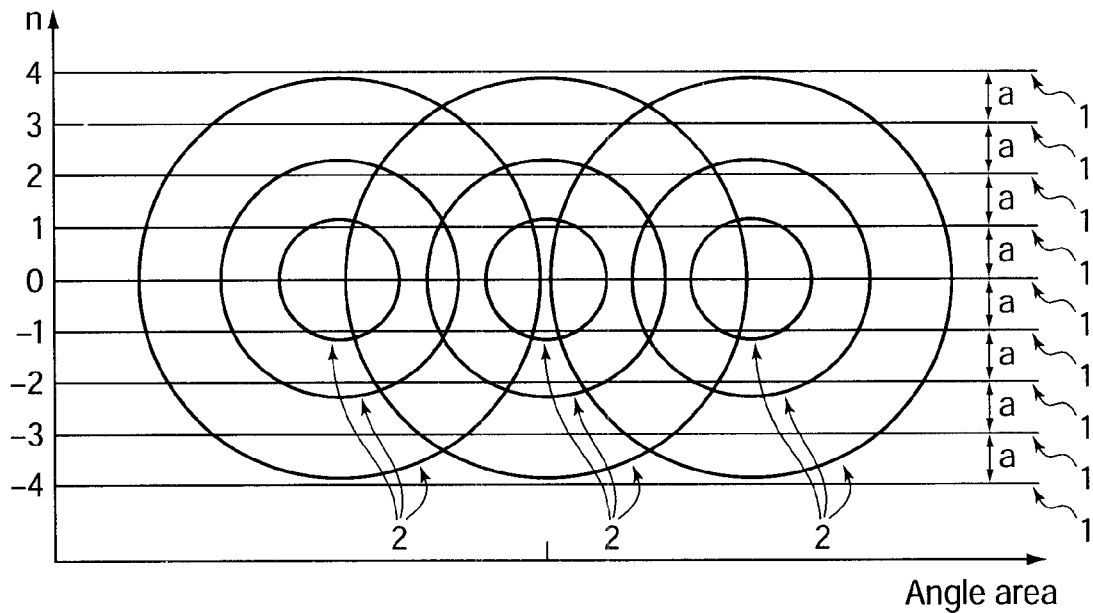
FIG. 3 shows a diagram with lateral cutting planes.

FIG. 3 shows a diagram with lateral cutting planes 0 through 4 and 0 through −4, which are arranged around basic plane (0 degrees) for reasons of symmetry. If, for example, the individual lateral cutting planes 1 are arranged at the same distance a, the same distribution of the intensities of the individual beams is obtained for intensity I on lateral cutting planes 1 labeled as positive as on negative cutting planes −1 through −4.

For the sake of completeness, it should be mentioned that an azimuth angle can also be calculated from the three antenna diagrams 2.

As can also be seen from FIG. 3, the individual intensity distributions are identical in the positive and negative section halves due to the symmetry of antenna diagrams 2. To distinguish between them, it is sufficient to store one additional value for the positive or negative half-plane. This can be the road clutter signal for the negative half-plane, for example. Distance a of lateral cutting plane 1 can be freely selected. For example, distance a can be selected so that it corresponds to an elevation angle $\alpha=0.5°$. Thus, with four positive and four negative lateral cutting planes 1, an angular range of $\pm 2°$ would be detected.

Figure 4:
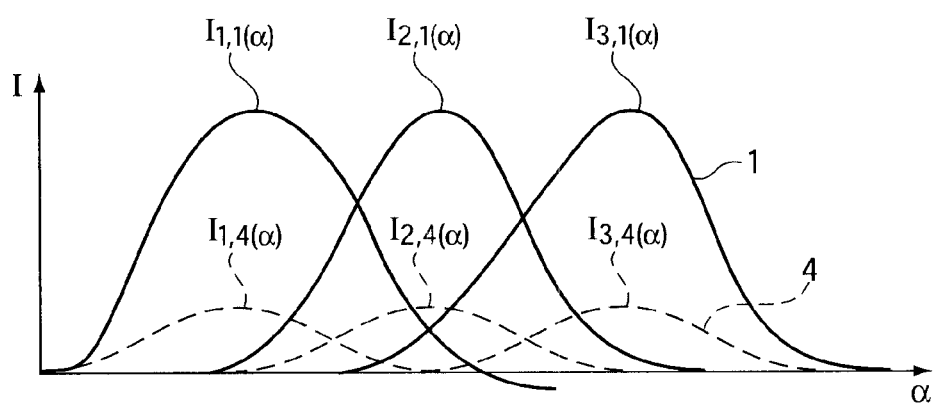
FIG. 4 shows the intensity distributions of the echo signals of a plurality of cutting planes.

FIG. 4 shows a diagram in which intensity I of the three antenna diagrams 2 for cutting plane 1 and cutting plane 4 are stored as a function of elevation angle $\alpha$. In the diagram, the first index number in intensity curves I corresponds to the respective antenna of the multibeam radar sensor and the second index number corresponds to the respective plane as a function of elevation angle $\alpha$. The diagram also shows that the intensity, for example, the amplitude is much greater in the first plane than in the curve of the fourth plane shown with a dashed line. Subsequently, the respective values for an antenna diagram are stored in a memory 15 for each plane. The values for the respective antenna diagram 2 can be stored in different manners. The individual measured values can be stored directly or, as an alternative, they can be normalized and/or stored in the form of appropriate parameters for different cutting planes, for example, as a set of coefficients of a polynomial.

The mode of operation is explained in more detail with reference to the flow chart of FIG. 5. It is assumed that individual cutting planes 1 are formed, for example, at distance a that corresponds to an elevation angle of 0.5°. Thus, according to FIG. 3, an analysis range of ±2° is obtained for the elevation angle. Of course, other graduations and numbers of planes can also be provided.

Figure 5:
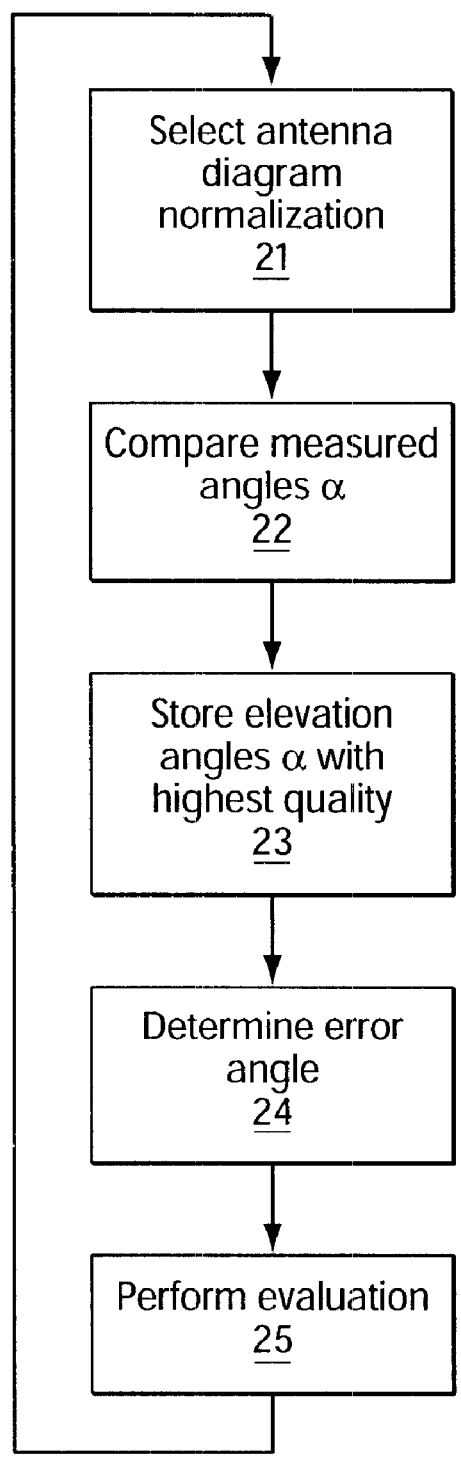
FIG. 5 shows a flow chart.

According to FIG. 5, an amplitude-independent normalization of the antenna diagrams is selected in position 21, for example, in the form of intensity distributions. Furthermore, a quality function which is derived from the measured amplitudes is determined. The quality function is determined by the known process of German Published Patent Application No. 197 48 604, for example. Then in position 22 all measured angles $\alpha$ of a certain cutting plane are compared to one another regarding their quality. The angle having the highest quality provides elevation angle $\alpha$ for this cutting plane 1. For the other cutting planes 1, the respective elevation angle $\alpha$ is also determined in the same manner. Thus an associated elevation angle is obtained for each cutting plane.

An alternative method involves determining an overall quality for each angle from the quality values of all cutting planes. The angle with the maximum overall quality is then the sought elevation angle $\alpha$.

Another alternative involves evaluating the quality values that are obtained in each step, i.e., the respective azimuth angles by taking into account the angle results of previous measurements. Thus an optimum total angle is obtained for lateral resolution with respect to the elevation, which takes into account both the previous measurements and the instantaneous quality evaluation.

Elevation angles $\alpha$ with the highest quality found are now stored in position 23, so that a long-term histogram can be created for long-term measurements with an arbitrarily high number of measurement cycles, through which a maladjustment of radar sensor 3 can be recognized, for example. Of course, in order to recognize the maladjustment, an additional parameter which defines the upward or downward direction of the elevation angle must be stored. This can be accomplished, for example, via reflection signals from the road surface (road clutter).

For example, in position 24, the error angle for elevation adjustment stored with the highest frequency is determined by averaging the values from the stored long-term. This error angle is then the sought angle for the error adjustment of the radar sensor taking into account the road clutter.

For recognizing maladjustment, an evaluation can be performed, as an alternative, calculating the appropriate angle from the long-term histogram from the position of the vertical quality maximum.

Using this procedure, a reliable angle analysis is obtained, which has minimum dependence on vertical fluctuations. In addition, this procedure allows the pitching motion of a motor vehicle during travel to be calculated. For example, if the distance to a vehicle traveling ahead is measured using radar sensor 3 (ACC Adaptive Cruise Control), the distance signal obtained from the elapsed time or from the phase of the echo signal can be corrected in a simple manner taking into consideration the pitching motion of the vehicle.

What is claimed is:

1. A method of determining an elevation angle error in a multibeam radar sensor, comprising:

directing at least two transmitted beams onto a radar target;

determining and storing comparison values of an antenna diagram in a basic plane in a cutting plane formed by the multibeam radar sensor and the radar target;

comparing reflected received beams of the at least two transmitted beams to the previously determined and stored comparison values for each reflected received beam;

determining an elevation angle from the comparison values;

forming at least one additional, laterally arranged cutting plane at a predefined distance;

determining values for at least one additional reference antenna diagram as a function of the elevation angle;

storing the values for the at least one additional reference antenna diagram in a memory for each additional, laterally arranged cutting plane; and determining an error angle for the elevation angle from a comparison with the at least one additional reference antenna diagram.

2. The method according to claim 1, further comprising the step of:

storing for the at least one additional reference antenna diagram only values for one symmetry half of the cutting plane formed by the multibeam radar sensor and the radar target and the at least one additional, laterally arranged cutting plane.

3. The method according to claim 1, further comprising the step of:

storing additional information in order to determine a direction of the elevation angle.

4. The method according to claim 3, wherein:

the additional information includes echo signals from a road surface.

5. The method according to claim 1, further comprising the step of:

forming a quality value for the elevation angle from stored values of the basic plane and the at least one additional, laterally arranged cutting plane.

6. The method according to claim 5, further comprising the step of:

outputting the elevation angle with a highest quality on the basis of the quality value.

7. The method according to claim 1, wherein:

angle results from previous measurements are included in a selection.

8. The method according to claim 1, further comprising the step of:

analyzing each elevation angle and associated one of the basic plane and the at least one additional, laterally arranged cutting plane in a histogram.

9. The method according to claim 8, further comprising the steps of:

storing the elevation angle; and using an absolute value of a mean value of the stored elevation angle as a measure for a maladjustment of the multibeam radar sensor.

10. The method according to claim 8, further comprising the step of:

performing an automatic adjustment of the multibeam radar sensor in accordance with a value of a vertical maladjustment angle.

11. The method according to claim 1, further comprising the step of:

storing the at least one additional reference antenna diagram as a coefficient of a polynomial.

12. The method according to claim 1, further comprising the step of:

when a maladjustment limit value is exceeded, performing at least one of the following steps:
outputting information, and
shutting off the multibeam radar sensor.

13. A radar sensor, comprising:

at least two transmitting/receiving antennas;

a controller for transmitting, receiving, and analyzing echo signals;

an angle output for an elevation angle; and a memory for storing values of at least one additional antenna diagram of an additional lateral cutting plane, wherein:
the controller determines an error angle for the elevation angle from the stored values, and
the error angle is picked up at the angle output.

14. The radar sensor according to claim 13, wherein:

for symmetric antenna diagrams the memory receives values from one symmetry half of other cutting planes.

* * * * *